United States Patent
Tang et al.

(10) Patent No.: US 10,120,241 B2
(45) Date of Patent: Nov. 6, 2018

(54) DISPLAY PANEL AND MANUFACTURING METHOD THEREOF AND DISPLAY DEVICE

(71) Applicants: BOE Technology Group Co., Ltd., Beijing (CN); Hefei Xinsheng Optoelectronics Technology Co., Ltd., Anhui (CN)

(72) Inventors: Wenhao Tang, Beijing (CN); Sang Man Yuk, Beijing (CN); Bin Li, Beijing (CN); Huifang Yuan, Beijing (CN); Tao Zhu, Beijing (CN); Haibin Yin, Beijing (CN); Jian Chen, Beijing (CN); Anxin Dong, Beijing (CN); Qun Fang, Beijing (CN)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 30 days.

(21) Appl. No.: 15/097,545

(22) Filed: Apr. 13, 2016

(65) Prior Publication Data
US 2016/0370631 A1   Dec. 22, 2016

(30) Foreign Application Priority Data
Jun. 19, 2015   (CN) .......................... 2015 1 0345292

(51) Int. Cl.
*G02F 1/1339* (2006.01)
*G02F 1/1335* (2006.01)

(52) U.S. Cl.
CPC ........ *G02F 1/13394* (2013.01); *G02F 1/1339* (2013.01); *G02F 1/133512* (2013.01);
(Continued)

(58) Field of Classification Search
None
See application file for complete search history.

(56) References Cited

U.S. PATENT DOCUMENTS

| | | | |
|---|---|---|---|
| 9,442,326 B2 * | 9/2016 | Oono | G02F 1/13394 |
| 2007/0291216 A1 * | 12/2007 | Chan | G02F 1/1339 |
| | | | 349/153 |

(Continued)

FOREIGN PATENT DOCUMENTS

| | | |
|---|---|---|
| CN | 2906677 Y | 5/2007 |
| CN | 201000522 Y | 1/2008 |

(Continued)

OTHER PUBLICATIONS

May 25, 2017—(CN) First Office Action Appn 201510345292.7 with English Tran.

(Continued)

*Primary Examiner* — Ryan Crockett
(74) *Attorney, Agent, or Firm* — Banner & Witcoff, Ltd.

(57) ABSTRACT

A display panel and a manufacturing method thereof and a display device. The display panel includes a first substrate and a second substrate disposed opposite to the first substrate. The display panel further includes: a sealant disposed in an auxiliary region of the first substrate; and a first spacer disposed in an auxiliary region of the second substrate. A position of the first spacer in the auxiliary region of the second substrate corresponds to a position of the sealant in the auxiliary region of the first substrate.

15 Claims, 5 Drawing Sheets

(52) U.S. Cl.
CPC ............... *G02F 1/133514* (2013.01); *G02F 2001/13398* (2013.01)

(56) References Cited

U.S. PATENT DOCUMENTS

| | | | | |
|---|---|---|---|---|
| 2009/0066884 | A1* | 3/2009 | Okabe | G02F 1/1337 349/86 |
| 2009/0231524 | A1* | 9/2009 | Tanaka | G02F 1/1339 349/110 |
| 2010/0181659 | A1* | 7/2010 | Hanson | H01L 23/49558 257/676 |
| 2012/0033150 | A1* | 2/2012 | Kim | G02F 1/1339 349/43 |
| 2012/0033162 | A1* | 2/2012 | Ahn | G02F 1/1339 349/106 |
| 2014/0176895 | A1* | 6/2014 | Park | G02F 1/1339 349/153 |
| 2015/0168764 | A1* | 6/2015 | Saeki | G02F 1/133512 349/42 |
| 2015/0185516 | A1* | 7/2015 | Lee | G02F 1/1339 349/110 |
| 2015/0346533 | A1* | 12/2015 | Park | G02F 1/13394 349/42 |
| 2017/0045782 | A1* | 2/2017 | Cho | G02F 1/133514 |
| 2017/0052405 | A1* | 2/2017 | Yu | G02F 1/133512 |

FOREIGN PATENT DOCUMENTS

| | | |
|---|---|---|
| CN | 101441349 A | 5/2009 |
| CN | 101706630 A | 5/2010 |
| JP | 2012141606 A | 7/2012 |

OTHER PUBLICATIONS

Jan. 9, 2018—(CN) Second Office Action Appn 201510345292.7 with English Tran.

* cited by examiner

DISPLAY PANEL AND MANUFACTURING METHOD THEREOF AND DISPLAY DEVICE

This application claims priority to and the benefit of Chinese Patent Application No. 201510345292.7 filed on Jun. 19, 2015, which application is incorporated herein in its entirety.

TECHNICAL FIELD

Embodiments of the present disclosure relate to a display panel and a manufacturing method thereof and a display device.

BACKGROUND

With continuous development of display technologies, in order to improve resolution of display panels and to reduce power consumption of the display panels, more and more display panels are additionally provided with a high polymer film (also known as organic film) on the array substrate.

However, because the high polymer film has a certain thickness, in the case where a thickness of a liquid crystal layer between two substrates is unchanged, a thickness of a sealant used for bonding the two substrates may be increased, causing more air and moisture to get into the display panels. Thus, a display defective rate of the display panels may increase.

SUMMARY

Embodiments of the present disclosure provide a display panel and a manufacturing method thereof and a display device, which may reduce the display defective rate of the display panels.

A display panel provided by an embodiment of the present disclosure includes a first substrate and a second substrate disposed opposite to the first substrate. The display panel further includes: a sealant disposed in an auxiliary region of the first substrate; and a first spacer disposed in an auxiliary region of the second substrate, where a position of the first spacer in the auxiliary region of the second substrate corresponds to a position of the sealant in the auxiliary region of the first substrate.

A display device provided by an embodiment of the present disclosure includes the above-mentioned display panel.

A manufacturing method of a display panel provided by an embodiment of the present disclosure includes: using a photolithography process to form a first spacer in an auxiliary region of a second substrate; forming a sealant in an auxiliary region of the first substrate or on the first spacer, where a position of the first spacer corresponds to a position of the sealant; and assembling the second substrate and the first substrate to form the display panel.

BRIEF DESCRIPTION OF THE DRAWINGS

In order to illustrate the technical solutions in the embodiments of the present disclosure or the existing arts more clearly, the drawings need to be used in the description of the embodiments or the existing arts will be briefly described in the following; it is obvious that the drawings described below are only related to some embodiments of the present disclosure, for one ordinary skilled person in the art, other drawings can be obtained according to these drawings.

DETAILED DESCRIPTION

Hereafter, the technical solutions of the embodiments of the present disclosure will be described in a clearly and fully understandable way in connection with the drawings related to the embodiments of the invention. It is obvious that the described embodiments are just a part but not all of the embodiments of the present disclosure.

The drawings mentioned in the embodiments of the present disclosure are only to exemplarily illustrate the technical solutions of the present disclosure. The other drawings obtained from the drawings of the embodiments of the present disclosure through simple transformations should be within the scope of the present disclosure.

A "layer" in the embodiments of the present disclosure may be a film of a certain material formed through a film forming process including a coating, spraying, or printing process. Specifically, a method may be selected according to the actual forming requirements in order to form a corresponding "layer."

In the embodiments of the present disclosure, a photolithography process refers to a process for forming a predetermined pattern through film forming, exposing, developing and other photolithography steps. The photolithography process may utilize photoresist, mask plates, exposure machine and developer, etc., to form the predetermined pattern by performing the abovementioned photolithography steps. A film forming process refers to a process for forming a thin film through film forming approaches including a coating, spraying, or printing process. A masking process refers to a process for exposing and developing a "layer" by using a mask plate.

Hereafter, a display panel and a manufacturing method thereof and a display device provided by the embodiments of the present disclosure will be described in details in connection with the drawings.

Figure 1:
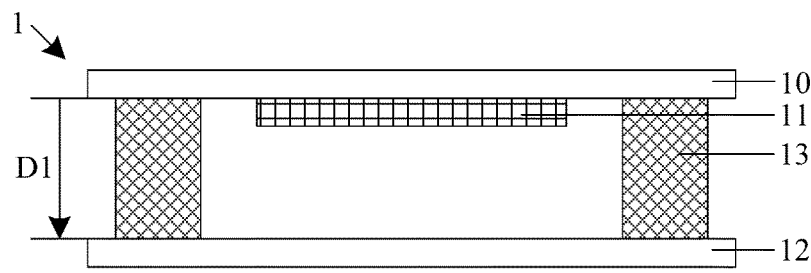
FIG. 1 is a schematic diagram of a structure of a display panel in one technical solution.

In a technical solution illustrated by FIG. 1, a display panel 1 is additionally provided with a high polymer film 11 on an array substrate 10. The display panel 1 includes two substrates, including an array substrate 10 and a color filter substrate 12. In the manufacture process of the display panel 1, generally, one of the two substrates is provided with a sealant 13, and the other substrate is disposed opposite to the substrate; i.e., the display panel 1 is formed by bonding the two substrates together via the sealant 13. However, because the high polymer film has a certain thickness, as illustrated by FIG. 1, in the case where the thickness of a liquid crystal layer between the two substrates is unchanged, a thickness D1 of the sealant 13 used for bonding the two substrates is increased. Thus, there may be more air and moisture entering into the display panel, which may increase the display defective rate of the display panel.

Compared with the technical solution in FIG. 1, a display panel and a manufacturing method thereof and a display device provided by embodiments of the present disclosure may reduce the thickness of the sealant disposed in an auxiliary region of the first substrate (i.e., compared with FIG. 1, a part of the sealant is replaced by the first spacer), such that air and moisture that may enter into the display panel may be reduced, thereby reducing the display defective rate of the display panel.

Figure 2:
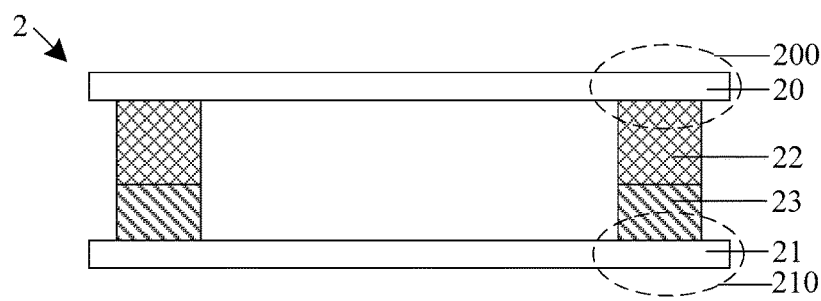
FIG. 2 is a first schematic diagram of a structure of a display panel provided by an embodiment of the present disclosure.

As illustrated by FIG. 2, an embodiment of the present disclosure provides a display panel 2. The display panel 2 comprises a first substrate 20 and a second substrate 21 disposed opposite to the first substrate 20. The display panel 2 further comprises: a sealant 22 disposed in an auxiliary region 200 of the first substrate 20; and a first spacer 23 disposed in an auxiliary region 210 of the second substrate 21 at a position corresponding to the position of the sealant 22, where the first spacer 23 is disposed at a position of the auxiliary region 210 that corresponds to the position of the sealant 22. For example, a position of an orthogonal projection of the first spacer 23 on the first substrate 20 coincides with the position of the sealant 22 on the auxiliary region 200 of the first substrate 20. Or, a position of an orthogonal projection of the sealant 22 on the second substrate 21 coincides with the position of the first spacer 23 on the auxiliary region 210 of the second substrate 21.

It can be understood that, in the display panel illustrated by FIG. 2, the sealant 22 and the first spacer 23 contact with each other, i.e., the sealant 22 and the first spacer 23 are bonded together. For example, the sealant 22 and the first spacer 23 are jointed together between the first substrate 20 and the second substrate 21.

Figure 3:
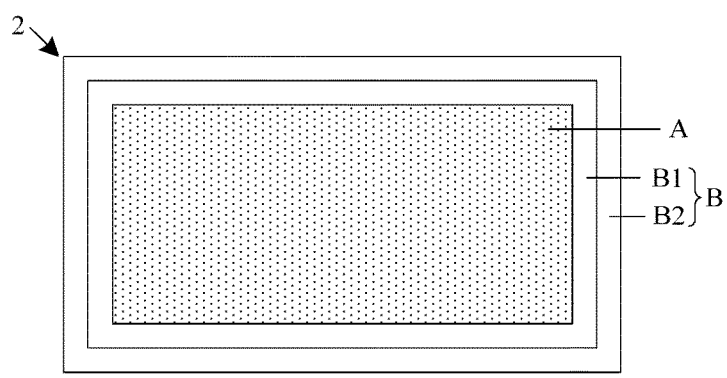
FIG. 3 is a schematic top view of the display panel in FIG. 2 provided by an embodiment of the present disclosure.

As illustrated by FIG. 3, a plan view of the display panel 2 illustrated by FIG. 2 is shown. In FIG. 3, the display panel 2 comprises a display region A and a peripheral region B, where the peripheral region B comprises a wiring region B1 used for wiring and an auxiliary region B2 used for disposing the sealant (e.g., the auxiliary region B2 corresponds to the auxiliary region 200 of the first substrate and the auxiliary region 210 of the second substrate in FIG. 2). Both the first spacer and the sealant provided by the embodiments of the present disclosure are disposed in the auxiliary region B2 of the display panel.

For example, the auxiliary region of the first substrate, the auxiliary region of the second substrate and the auxiliary region of the display panel mentioned in the embodiments of the present disclosure may refer to a region located in the peripheral region around the display region and outside the wiring region.

It should be noted that the display panel provided by the embodiments of the present disclosure is a display panel using a high polymer film. Because the high polymer film is generally disposed on the array substrate of the display panel, the high polymer film is not illustrated in the drawings (for example, not shown in FIGS. 2, 4a, 7, 9 and 10) provided by the embodiments of the present disclosure.

The display panel provided by the embodiments of the present disclosure is provided with a first spacer in the auxiliary region of the second substrate at a position corresponding to the position of the sealant disposed in the auxiliary region of the first substrate. As a result, a part of the sealant may be replaced by the first spacer, and the thickness of the sealant is reduced. For example, compared with FIG. 1, the thickness of the sealant disposed in the auxiliary region of the first substrate in FIG. 2 may be reduced (i.e., the thickness of the sealant between the first substrate and the second substrate being reduced), and the reduced part of the sealant is substituted by the first spacer. Thus, the air and moisture that may enter into the display panel through the sealant may be reduced, so as to reduce the display defective rate of the display panel.

Furthermore, in the embodiments of the present disclosure a first spacer is used to replace a part of the sealant, so as to reduce a usage amount of the sealant and to reduce the manufacturing cost.

Figure 4A:
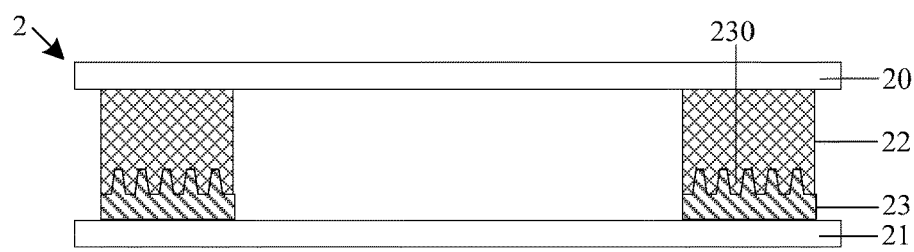
FIG. 4a is a second schematic diagram of a structure of a display panel provided by an embodiment of the present disclosure.

For example, on the basis of FIG. 2, as illustrated by FIG. 4a, grooves 230 are configured on a surface of the first spacer 23 that contacts with the sealant 22. For example, the first spacer 23 includes a first surface that contacts with the sealant 22 and a second surface that does not contact with the sealant 22, and the grooves 230 are disposed on the first surface that contacts with the sealant 22.

The first spacer provided by the embodiments of the present disclosure may increase the contacting area between the first spacer and the sealant via the grooves disposed on the surface of the first spacer that contacts the sealant, so as to increase an adhesive force between the first spacer and the sealant and to improve a supporting strength to the first substrate and the second substrate by the sealant, and so as to further improve the stability of the display panel.

Figure 4B:
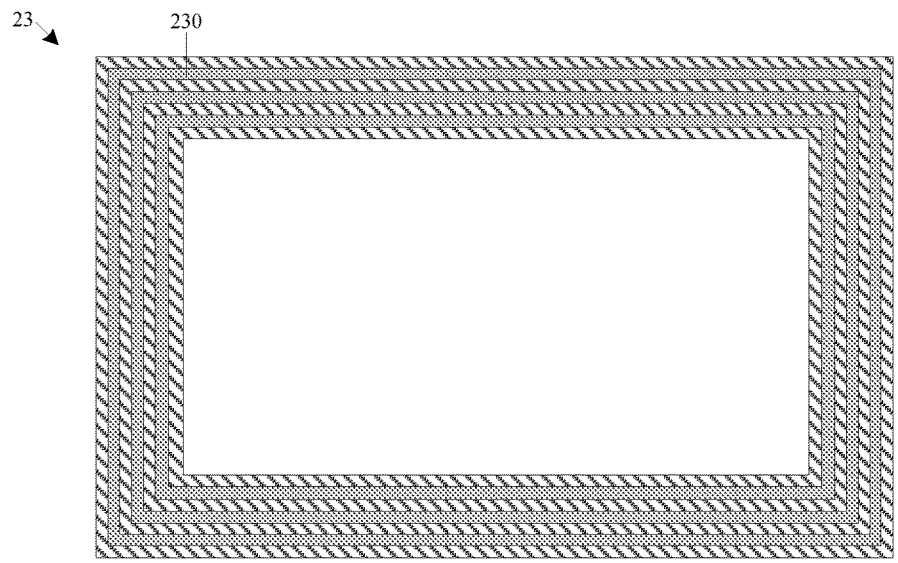
FIG. 4b is a schematic diagram of a structure of a first spacer provided by an embodiment of the present disclosure.

For example, as illustrated by FIG. 4b, each of the grooves 230 is formed as an annular loop on the first spacer 23. An annular loop stated in the embodiments of the present disclosure may refer to a rectangular ring illustrated by FIG. 4b which is formed by one of the grooves 230 on the first spacer 23.

For example, as illustrated by FIG. 4b, the number of the grooves 230 is at least two. Or, one groove 230 is also possible.

Figure 5:
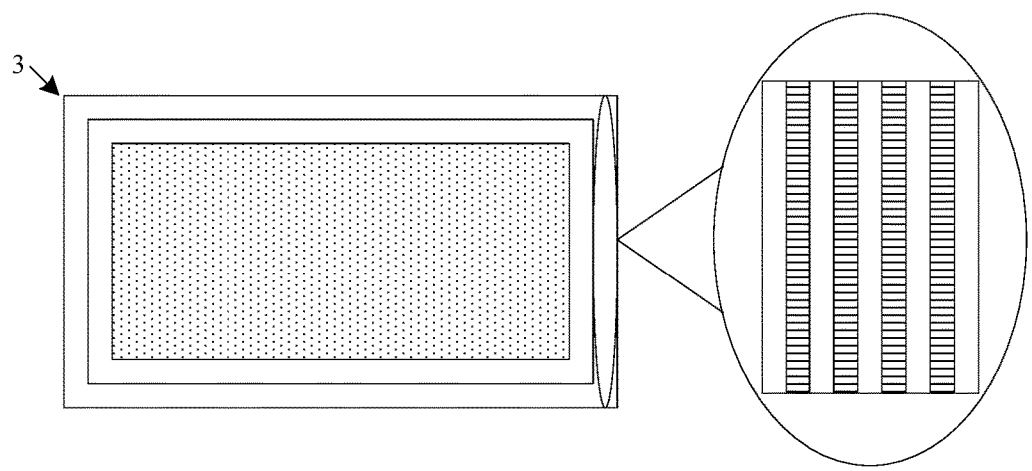
FIG. 5 is a first schematic diagram of a structure of a mask plate for manufacturing a first spacer provided by an embodiment of the present disclosure.
Figure 6:
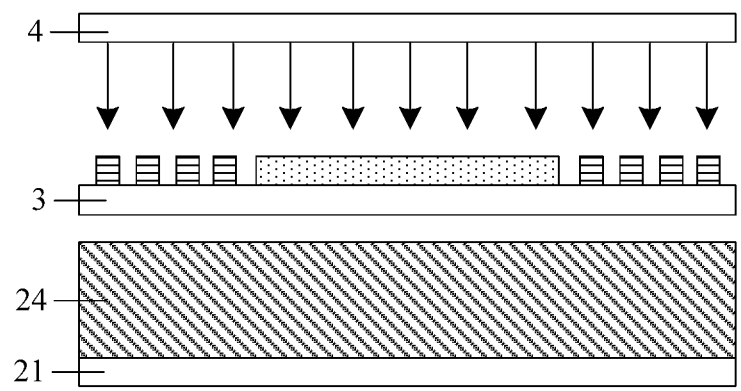
FIG. 6 is a schematic diagram of a process of forming a first spacer provided by an embodiment of the present disclosure.

As illustrated by FIG. 5, a schematic diagram of a structure of a mask plate 3 for manufacturing the first spacer 23 illustrated by FIG. 4a and FIG. 4b is shown by embodiments of the present disclosure. As illustrated by FIG. 6, a schematic diagram of using the mask plate 3 illustrated by FIG. 5 to form the first spacer 23 is illustrated. For example, as illustrated by FIG. 6, in the embodiments of the present disclosure, firstly a first spacer layer 24 is formed on the second substrate 21 by using a film forming process; and the mask plate 3 illustrated by FIG. 5 is disposed above the first spacer layer 24; afterwards, a light source 4 is used to irradiate on the mask plate 3, to perform exposure on the first spacer layer 24; finally the exposed first spacer layer 24 is developed, to form the first spacer 23 illustrated by FIG. 4a and FIG. 4b in the auxiliary region of the second substrate.

Figure 7:
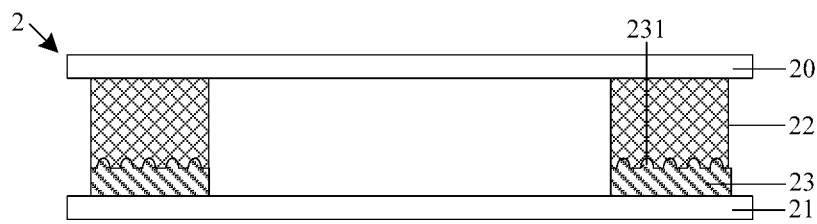
FIG. 7 is a third schematic diagram of a structure of a display panel provided by an embodiment of the present disclosure.

For example, on the basis of FIG. 2, as illustrated by FIG. 7, a plurality of hemispherical bodies 231 are provided on a surface of the first spacer 23 contacting the sealant 22.

The embodiments of the present disclosure may increase the contacting area between the first spacer and the sealant by configuring a plurality of hemispherical bodies on a surface of the first spacer contacting the sealant. An adhesive force between the first spacer and the sealant may be increased and a supporting strength to the first substrate and the second substrate by the sealant may be improved, so as to further enhance the stability of the display panel.

Figure 8:
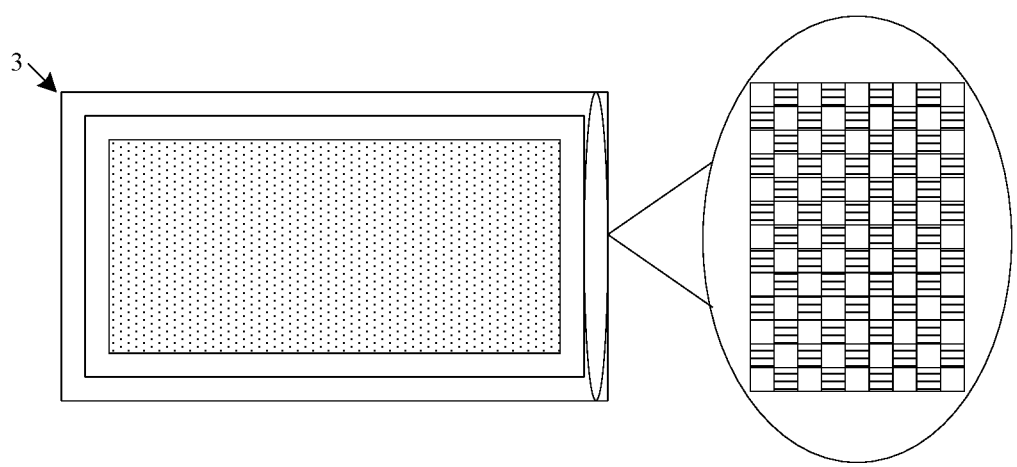
FIG. 8 is a second schematic diagram of a structure of a mask plate for manufacturing a first spacer provided by an embodiment of the present disclosure.

As illustrated by FIG. 8, a schematic diagram of a structure of a mask plate 3 for forming the first spacer illustrated by FIG. 7 is shown. For example, the technology of using the mask plate 3 illustrated by FIG. 8 to form a first spacer and the technology of using the mask plate illustrated by FIG. 5 to form a first spacer are similar, and related description may be referred to that of the technology of using the mask plate illustrated by FIG. 5 to form the first spacer illustrated by FIG. 6. Similar description will not be repeated here.

For example, upon a plurality of hemispherical bodies being configured on the surface of the first spacer contacting the sealant, an arrangement mode of the plurality of hemispherical bodies may be determined according to actual design requirements, and no limitation is placed here. For example, as illustrated by FIG. 7, the hemispherical bodies 231 are arranged at equal intervals.

In embodiments of the present disclosure, the plurality of hemispherical bodies may be arranged at equal intervals, which can make the first spacer to evenly contact with the sealant, so as to guarantee the supporting strength to the first substrate and the second substrate by the sealant to be relatively even, and to guarantee the stability of the display panel.

Furthermore, the display panel provided by the embodiments of the present disclosure can effectively reduce occurrence of a defective phenomenon such as sealant peeling in the tests under high temperature and high moisture, as well as reducing the usage amount of the sealant and increasing the adhesive force between the first spacer and the sealant.

Figure 9:
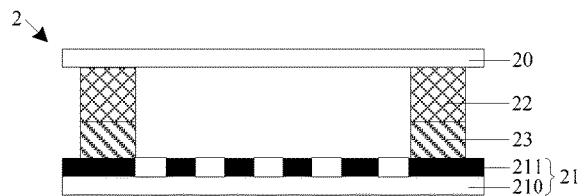
FIG. 9 is a fourth schematic diagram of a structure of a display panel provided by an embodiment of the present disclosure.

For example, on the basis of FIG. 2, as illustrated by FIG. 9, in the display panel 2 provided by the embodiments of the present disclosure, the second substrate 21 is a color filter substrate, and the color filter substrate comprises a first base substrate 210 and a black light shielding layer 211 disposed on the first base substrate 210. The first spacer 23 is disposed on the black light shielding layer 211, and a position of the first spacer 23 corresponds to a position of the sealant 22. For example, a position of an orthogonal projection of the sealant 22 on the black light shielding layer 211 coincides with a position of the first spacer 23 on the black light shielding layer 211.

It can be understood that, as illustrated by FIG. 9, when the second substrate 21 is a color filter substrate, the first substrate 20 is an array substrate, and the sealant 22 is disposed on the array substrate. Upon the first spacer being disposed on the color filter substrate, the first spacer may be disposed on the black light shielding layer of the color filter substrate, and the first spacer can be formed together with a second spacer located in a display region on the color filter substrate, so as to remove some forming processes.

In the embodiments of the present disclosure, the black light shielding layer may comprise a first black light shielding portion located in a display region of the color filter substrate and a second black light shielding portion located in a peripheral region of the color filter substrate. The first black light shielding portion comprises a plurality of black blocks arranged in an array, and these black blocks are generally referred to as a black matrix. The first spacer in the embodiments of the present disclosure is disposed on the second black light shielding portion disposed in the peripheral region (for example, an auxiliary region in the peripheral region) of the color filter substrate.

Figure 10:
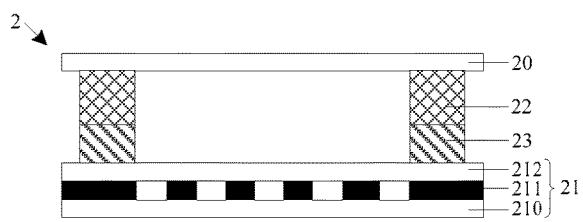
FIG. 10 is a fifth schematic diagram of a structure of a display panel provided by an embodiment of the present disclosure.

For example, on the basis of FIG. 9, as illustrated by FIG. 10, in the display panel 2 provided by the embodiments of the present disclosure, the color filter substrate further comprises a protecting layer 212 disposed on the black light shielding layer 211; and the first spacer 23 is disposed on the protecting layer 212, and a location of the first spacer 23 corresponds to a position of the sealant. For example, a position of an orthogonal projection of the sealant 22 on the protecting layer 212 coincides with a position of the first spacer 23 on the protecting layer 212.

By disposing a protecting layer on the black light shielding layer and then disposing the first spacer on the protecting layer, a plane for disposing the first spacer can achieve good flatness, thereby facilitating forming of the first spacer.

For example, as illustrated by FIG. 2, in the display panel 2 provided by the embodiments of the present disclosure, the second substrate 21 is an array substrate, the first spacer 23 is disposed on the array substrate, and a position of the first spacer 23 corresponds to a position of the sealant 22.

It can be understood that, as illustrated by FIG. 2, upon the second substrate 21 being an array substrate, the first substrate 20 is a color filter substrate, and the sealant 22 is disposed on the color filter substrate.

For example, the display panel further comprises a second spacer disposed in a display region of the color filter substrate. The second spacer and the first spacer are disposed in the same layer. In the embodiments of the present disclosure, a forming process can be saved by forming the first spacer and the second spacer in the same layer.

For example, the display panel provided by the embodiments of the present disclosure may be a liquid crystal display panel. The liquid crystal display panel may be a twisted nematic (TN) mode display panel, an in-plane switching (IPS) mode display panel, or an advanced super dimension switch (ADS) display panel. No limitations are placed here.

The embodiments of the present disclosure provide a display panel, and the display panel comprises a first substrate and a second substrate disposed opposite to the first substrate. The display panel further comprises a sealant disposed in an auxiliary region of the first substrate and a first spacer disposed in an auxiliary region of the second substrate. A position of the first spacer corresponds to a position of the sealant. Based on the technical solution, because a first spacer is disposed in the auxiliary region of the second substrate at a position corresponding to the position of the sealant disposed in the auxiliary region of the first substrate, in the technology of a display panel using a high polymer film, the thickness of the sealant in the auxiliary region of the first substrate can be reduced compared with the technical solution of FIG. 1, so as to reduce the air and moisture that may enter into the display panel, and to reduce the display defective rate of the display panel.

Furthermore, the adhesive force between the first spacer and the sealant can be increased and the supporting strength to the first substrate and the second substrate by the sealant can be improved by providing grooves or hemisphere bodies on the surface of the first spacer that contacts with the sealant, so as to improve the stability of the display panel.

Furthermore, in the display panel provided by the embodiments of the present disclosure, the first spacer may be disposed on the color filter substrate, or may be disposed on the array substrate, which can be selected according to the actual usage requirements. No limitation is placed here.

An embodiment of the present disclosure provides a display device, and the display device may comprise the display panel according the abovementioned embodiments. For example, the structure of the display panel and the relevant manufacturing processes may be referred to in the relevant description of FIGS. 2 to 10 in the abovementioned embodiments. Similar description will not be repeated here.

An embodiment of the present disclosure provides a display device, and the display device comprises a display panel. The display panel comprises a first substrate and a second substrate disposed opposite to the first substrate, and the display panel further comprises a sealant disposed in an auxiliary region of the first substrate and a first spacer disposed in an auxiliary region of the second substrate at a position corresponding to a position of the sealant. Based on the technical solution, because a first spacer is disposed in the auxiliary region of the second substrate at a position corresponding to the position of the sealant disposed in the auxiliary region of the first substrate, in the technology of a display panel using a high polymer film, the thickness of the sealant disposed in the auxiliary region of the first substrate can be reduced compared with the technical solution of FIG. 1 (i.e., the thickness of the sealant between the first substrate and the second substrate can be reduced), so as to reduce the air and moisture that may enter into the display panel and to reduce the display defective rate of the display panel.

Figure 11:
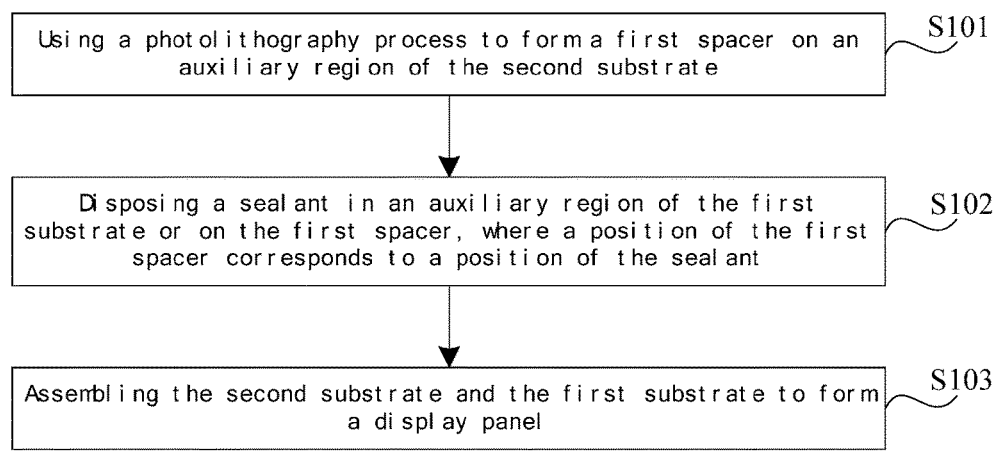
FIG. 11 is a first flow diagram of a manufacturing method of a display panel provided by an embodiment of the present disclosure.

As illustrated by FIG. 11, an embodiment of the present disclosure provides a manufacturing method of a display panel, and the manufacturing method may comprise:

Step S101, using a photolithography process to form a first spacer in an auxiliary region of a second substrate.

Step S102, disposing a sealant in an auxiliary region of the first substrate or on the first spacer, where the position of the first spacer corresponds to the position of the sealant.

Step S103, assembling the second substrate and the first substrate together to form a display panel.

For example, the structure of the display panel manufactured according to the manufacturing method illustrated by FIG. 11 may be referred to that of the display panel illustrated by FIG. 2. Similar description will not be repeated here.

In the display panel provided by the embodiments of the present disclosure, upon the first substrate being a color filter substrate, the second substrate is an array substrate; upon the first substrate being an array substrate, the second substrate is a color filter substrate.

In the case where the second substrate is a color filter substrate, the manufacturing method provided by the embodiments of the present disclosure may further comprise: forming a second spacer in a display region of the color filter substrate, where the second spacer and the first spacer are disposed in the same layer. That is, the first spacer formed in the auxiliary region of the second substrate in the abovementioned step S101 and the second spacer located in a display region on the color filter substrate can be formed at the same time, so as to reduce some forming steps.

When manufacturing a display panel in the embodiments of the present disclosure, firstly a photolithography process is used to form a first spacer in an auxiliary region of the second substrate; then a sealant is disposed in the auxiliary region of the first substrate or on the first spacer, and the position of the first spacer on the second substrate corresponds to the position of the sealant; and finally the second substrate and the first substrate are assembled to form a display panel. Because a first spacer is disposed in the auxiliary region of the second substrate at a position corresponding to the position of the sealant, in the technology of a display panel using a high polymer film, the thickness of the sealant disposed between the first substrate and the second substrate can be reduced compared with the technical solution of FIG. 1, so as to reduce the air and moisture that may enter into the display panel and to reduce the display defective rate of the display panel.

Figure 12:
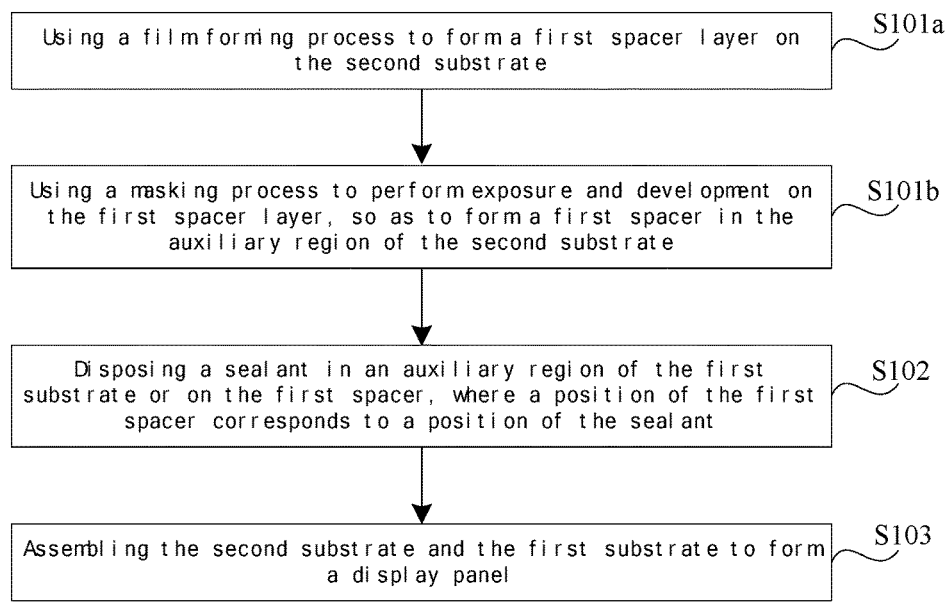
FIG. 12 is a second flow diagram of a manufacturing method of a display panel provided by an embodiment of the present disclosure.

For example, on the basis of FIG. 11, as illustrated by FIG. 12, the abovementioned step S101 may comprise:

Step S101*a*, using a film forming process to form a first spacer layer on the second substrate.

Step S101*b*, using a masking process to perform exposure and development to the first spacer layer, so as to form a first spacer in the auxiliary region of the second substrate.

In the abovementioned step S101*a*, a coating, spraying, printing or other film forming process may be used to form a resin thin film on the second substrate, i.e., a first spacer layer.

In the abovementioned step S101*b*, a masking process may be used to perform exposure and development to the first spacer layer formed on the second substrate, so as to form a first spacer in the auxiliary region of the second substrate.

For example, in the abovementioned step S101*b*, a structure of the mask plate used in the step of using a masking process to form a first spacer may be referred to a structure of the mask plate illustrated by FIG. 5 and FIG. 8. Similar description will not be repeated here.

Furthermore, the structure of the first spacer manufactured by the embodiments of the present disclosure may be referred to the relevant description of the structure of the first spacer illustrated by FIGS. 4*a*, 4*b* and 7 for details, and similar description will not be repeated here.

For example, in the display panel provided by the embodiments of the present disclosure, the second substrate is a color filter substrate, and the color filter substrate comprises a first base substrate and a black light shielding layer disposed on the first base substrate. The abovementioned step S101*a* may comprise:

Step S101*a*1, using a film forming process to form a first spacer layer on the black light shielding layer.

For example, the abovementioned color filter substrate may further comprise a protecting layer disposed on the black light shielding layer. The abovementioned step S101*a*1 may further comprise:

Step S101*a*2, using a film forming process to form a first spacer layer on the protecting layer.

By disposing a protecting layer on the black light shielding layer and then disposing the first spacer on the protecting layer, a plane for disposing the first spacer can achieve good flatness, thereby facilitating forming of the first spacer.

Or, in the display panel provided by the embodiments of the present disclosure, the second substrate is an array substrate, and the abovementioned S101*a* may comprise:

S101*a*3, using a film forming process to form a first spacer layer on the array substrate.

The embodiment of the present disclosure provides a manufacturing method of a display panel, and the method comprises: using a photolithography process to form a first spacer in an auxiliary region of the second substrate; disposing a sealant in the auxiliary region of the first substrate or on the first spacer, where the position of the first spacer corresponds to the position of the sealant; and assembling the second substrate and the first substrate together to form a display panel. Based on the technical solution, because a first spacer is disposed in an auxiliary region of the second substrate at a position corresponding to the position of the sealant disposed in the auxiliary region of the first substrate, in the technology of a display panel using a high polymer film, the thickness of the sealant in the auxiliary region of the first substrate can be reduced compared with the technical solution of FIG. 1, so as to reduce the air and moisture that may enter into the display panel and to reduce the display defective rate of the display panel.

It should be noted that, in the drawings, the size of a layer or an area may be exaggerated for clarity of the drawings. Besides, it is understandable that if an element or a layer is said to be "under" another element or layer, it can be directly under the other element or an intermediate layer may exist therebetween. Besides, it is understandable that if a layer or an element is said to be "between" two layers or "between" two elements, it can be the only one layer or element between the two layers or two elements, or one or more intermediate layer or element can exist. Similar reference marks in the full text refer to the similar elements.

In the present disclosure, the terms "first," "second," "third", etc. are not intended to indicate or imply any importance, but merely used for description purposes. The term "plurality" refers to two or more than two, unless otherwise defined.

The foregoing are merely specific embodiments of the invention, but not limitative to the protection scope of the invention. One skilled in the art could devise variations or replacements that within the scope and the spirit of the present invention, those variations or replacements shall belong to the protection scope of the invention. Thus, the protection scope of the invention shall be defined by the accompanying claims.

The present disclosure claims the benefits of Chinese patent application No. 201510345292.7, which was filed with the SIPO on Jun. 19, 2015 and is incorporated herein in its entirety by reference as part of this application.

What is claimed is:

1. A display panel, comprising a first substrate and a second substrate disposed opposite to the first substrate, wherein the display panel further comprises:
   a sealant disposed in an auxiliary region of the first substrate; and
   a first spacer disposed in an auxiliary region of the second substrate, wherein a position of the first spacer in the auxiliary region of the second substrate corresponds to a position of the sealant in the auxiliary region of the first substrate, and
   wherein,
   at least one groove is provided on a surface of the first spacer contacting the sealant;
   the second substrate is a color filter substrate, the color filter substrate comprises a first base substrate and a black light shielding layer disposed on the first base substrate;
   the first spacer is disposed on the black light shielding layer and a position of the first spacer on the black light shielding layer corresponds to the position of the sealant; and
   a distance between the bottom of the first spacer and the bottom of the groove is bigger than zero;
   wherein the color filter substrate further comprises a protecting layer disposed on a surface of the black light shielding layer; and
   the first spacer is disposed on the protecting layer and a position of the first spacer on the protecting layer corresponds to a position of the sealant.

2. The display panel according to claim 1, wherein the at least one groove is configured as an annular loop on the first spacer.

3. The display panel according to claim 2, wherein a quantity of the at least one groove is at least two.

4. The display panel according to claim 2, wherein the at least one groove is configured as a rectangular ring on the first spacer.

5. The display panel according to claim 1, wherein a plurality of hemispherical bodies is provided on the surface of the first spacer contacting the sealant.

6. The display panel according to claim 5, wherein the hemispherical bodies are arranged at equal intervals.

7. The display panel according to claim 1, wherein the display panel further comprises a second spacer disposed in a display region of the color filter substrate, and the second spacer and the first spacer are disposed in a same layer.

8. A display device, comprising the display panel according to claim 1.

9. The display panel according to claim 1, wherein the black light shielding layer comprises a first black light shielding portion located in a display region of the color filter substrate and a second black light shielding portion located in a peripheral region of the color filter substrate.

10. The display panel according to claim 9, wherein the first black light shielding portion comprises a black matrix arranged in an array.

11. A manufacturing method of a display panel, wherein the display panel comprises a first substrate and a second substrate, the manufacturing method comprising:
   using a photolithography process to form a first spacer in an auxiliary region of the second substrate;
   disposing a sealant in an auxiliary region of the first substrate or on the first spacer, wherein a position of the first spacer corresponds to a position of the sealant;
   assembling the second substrate and the first substrate to form the display panel; and
   providing at least one groove on a surface of the first spacer contacting the sealant;
   wherein, the second substrate is a color filter substrate, and the color filter substrate comprises a first base substrate and a black light shielding layer disposed on the first base substrate,
   wherein using the photolithography process to form the first spacer in the auxiliary region of the second substrate comprises:
   using a film forming process to form a first spacer layer on the second substrate, wherein the using the film forming process to form the first spacer layer on the second substrate comprises:
   using the film forming process to form the first spacer layer on the black light shielding layer, and
   wherein a distance between the bottom of the first spacer and the bottom of the groove is bigger than zero;
   wherein the color filter substrate further comprises a protecting layer disposed on a surface of the black light shielding layer; and
   the first spacer is disposed on the protecting layer and a position of the first spacer on the protecting layer corresponds to a position of the sealant.

12. The manufacturing method according to claim 11, wherein using the photolithography process to form the first spacer in the auxiliary region of the second substrate comprises:
   using a masking process to perform exposure and development on the first spacer layer to form the first spacer in the auxiliary region of the second substrate.

13. The manufacturing method according to claim 11, wherein:
   the color filter substrate further comprises a protecting layer disposed on the black light shielding layer; and
   using the film forming process to form the first spacer layer on the black light shielding layer, comprises:
      using the film forming process to form the first spacer on the protecting layer.

14. The manufacturing method according to claim 13, further comprising:
   forming a second spacer in a display region of the color filter substrate, wherein the second spacer and the first spacer are disposed in a same layer.

15. The manufacturing method of claim 11, further comprising:
   forming a second spacer in a display region of the color filter substrate, wherein the second spacer and the first spacer are disposed in a same layer.

* * * * *